(12) United States Patent
Penna et al.

(10) Patent No.: US 6,301,389 B1
(45) Date of Patent: *Oct. 9, 2001

(54) VIDEO IMAGE COLOR ENCODING

(75) Inventors: David E. Penna, Redhill; Asher J. Hoskins, Reigate, both of (GB)

(73) Assignee: U. S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/593,963

(22) Filed: Jan. 30, 1996

(30) Foreign Application Priority Data

Feb. 3, 1995 (GB) .................................................. 9502172
Feb. 16, 1995 (GB) .................................................. 9503063

(51) Int. Cl.⁷ ..................................................... G06K 9/36
(52) U.S. Cl. ............................................................. 382/232
(58) Field of Search .................................. 382/232, 245; 348/391, 393; 358/261.1, 426

(56) References Cited

U.S. PATENT DOCUMENTS

| | | | |
|---|---|---|---|
| 4,229,768 | * | 10/1980 | Kurahayashi et al. ............... 382/245 |
| 4,301,469 | * | 11/1981 | Modeen et al. ........................ 358/75 |
| 4,610,027 | * | 9/1986 | Anderson et al. .................... 382/245 |
| 4,646,356 | * | 2/1987 | Anderson et al. .................... 382/245 |
| 4,673,977 | * | 6/1987 | Stelzenmuller ...................... 358/400 |
| 4,847,677 | * | 7/1989 | Music et al. .......................... 382/245 |
| 5,032,838 | * | 7/1991 | Murayama et al. ............... 358/261.1 |
| 5,046,119 | * | 9/1991 | Hoffert et al. ........................ 382/232 |
| 5,046,122 | * | 9/1991 | Nakaya et al. ..................... 358/261.1 |
| 5,091,977 | * | 2/1992 | Katata et al. ......................... 382/245 |
| 5,172,237 | * | 12/1992 | Blonstein et al. ................. 358/261.3 |
| 5,198,898 | * | 3/1993 | Miyata .................................... 358/75 |
| 5,274,719 | * | 12/1993 | Taniguchi et al. ................... 382/245 |
| 5,339,164 | * | 8/1994 | Lim ...................................... 382/245 |
| 5,537,616 | * | 7/1996 | Higuchi ................................ 382/245 |
| 5,552,832 | * | 9/1996 | Astle .................................... 382/245 |

OTHER PUBLICATIONS

"Principles of Interactive Computer Graphics" W.M. Newman et al, Intenational Student Edition, 1979, p. 287–289.

* cited by examiner

Primary Examiner—Jose L. Couso
(74) Attorney, Agent, or Firm—Laurie E. Gathman

(57) ABSTRACT

A method is described of encoding pixel color values for a digital video image frame in which each different color within the image is assigned a color value. A predominant color is identified for the image frame and, in a first embodiment (FIG. 5), each pixel having a color other than the predominant color is separately coded as its respective color value (0010 to 1111), with runs of three or more successive pixels of the predominant color being run-length encoded. A further code (0000 0011 cccc), similar in arrangement to that indicating a run, is provided to allow a change in the specified predominant color during the course of a frame. In a further embodiment, runs of all colors are run-length encoded but with a shorter coding scheme for runs of the predominant color or, in a still further embodiment, a small range of predominant colors. A principle use for these coding schemes is to improve efficiency of coding for certain classes of image material.

20 Claims, 11 Drawing Sheets

| CODE | NIBBLE 1 | NIBBLE 2 | NIBBLE 3 | NIBBLE 4 | RUN LENGTH |
|---|---|---|---|---|---|
| SINGLE | 0001 | - | - | - | 1 PIXEL |
| SINGLE + | 0001 | 0001 | - | - | 2 PIXELS |
| SHORT | 0000<br>0000<br>0000 | 0011<br>....<br>1111 | -<br><br>- | -<br><br>- | 3 PIXELS TO 15 PIXELS |
| SHORT + | 0000 | 1111 | 0001 | - | 16 PIXELS |
| MEDIUM | 0000<br>0000<br>0000 | 0000<br>0000<br>0000 | 0001<br>....<br>1111 | -<br><br>- | 17 PIXELS TO 31 PIXELS |
| LONG | 0000<br>0000<br>0000 | 0001<br>0001<br>0001 | 0000<br>....<br>1111 | -<br><br>- | 32 PIXELS TO 47 PIXELS |
| LONGER | 0000<br>0000<br>0000 | 0010<br>0010<br>0010 | 0000<br>....<br>1111 | 0000<br>....<br>1111 | 48 PIXELS TO 303 PIXELS |

FIG. 4

| CODE | NIBBLE 1 | NIBBLE 2 | NIBBLE 3 | NIBBLE 4 | RUN LENGTH |
|---|---|---|---|---|---|
| SINGLE | 0001 | - | - | - | 1 PIXEL |
| SINGLE + | 0001 | 0001 | - | - | 2 PIXELS |
| SHORT | 0000<br>0000<br>0000 | 0100<br>....<br>1111 | -<br><br>- | -<br><br>- | 3 PIXELS TO 14 PIXELS |
| SHORT + | 0000 | 1111 | 0001 | - | 15 PIXELS |
| MEDIUM | 0000<br>0000<br>0000 | 0000<br>0000<br>0000 | 0001<br>....<br>1111 | -<br><br>- | 16 PIXELS TO 30 PIXELS |
| LONG | 0000<br>0000<br>0000 | 0001<br>0001<br>0001 | 0000<br>....<br>1111 | -<br><br>- | 31 PIXELS TO 46 PIXELS |
| LONGER | 0000<br>0000<br>0000 | 0010<br>0010<br>0010 | 0000<br>....<br>1111 | 0000<br>....<br>1111 | 47 PIXELS TO 302 PIXELS |
| CHANGE BACKGROUND | 0000 | 0011 | cccc | - | - | cccc = 0010 to 1111

FIG. 5

BACKGROUND

| CODE | NIBBLE 1 | NIBBLE 2 | NIBBLE 3 | NIBBLE 4 | NIBBLE 5 | RUN LENGTH |
|---|---|---|---|---|---|---|
| SINGLE | 0000 | 1111 | - | - | - | 1 Pixel |
| SINGLE+ | 0000 | 1110 | - | - | - | 2 Pixels |
| SHORT | 0000<br>0000<br>0000 | 0001<br>....<br>0111 | -<br><br>- | -<br><br>- | -<br><br>- | 3 Pixels<br>to<br>9 Pixels |
| MEDIUM | 0000<br>0000<br>0000 | 1100<br>1100<br>1100 | 0001<br>....<br>1111 | 0000<br>0000<br>0000 | -<br>-<br>- | 10 Pixels<br>to<br>24 Pixels |
| LONG | 0000<br>0000<br>0000 | 1101<br>1101<br>1101 | 0000<br>....<br>1111 | 0000<br>....<br>1111 | 0000<br>0000<br>0000 | 25 Pixels<br>to<br>280 Pixels |
| END OF BLOCK | 0000 | 0000 | - | - | - | - |

FIG. 6

NON-BACKGROUND

| CODE | NIBBLE 1 | NIBBLE 2 | NIBBLE 3 | NIBBLE 4 | NIBBLE 5 | RUN LENGTH |
|---|---|---|---|---|---|---|
| SINGLE | cccc | - | - | - | - | 1 Pixel |
| SINGLE+ | cccc | cccc | - | - | - | 2 Pixels |
| SINGLE++ | cccc | cccc | cccc | - | - | 3 Pixels |
| SHORT | 0000<br>0000<br>0000 | 1000<br>....<br>1011 | cccc<br>cccc<br>cccc | -<br>-<br>- | -<br>-<br>- | 4 Pixels to 7 Pixels |
| SHORT+ | 0000 | 1011 | cccc | cccc | - | 8 Pixels |
| MEDIUM | 0000<br>0000<br>0000 | 1100<br>1100<br>1100 | 0000<br>....<br>1111 | cccc<br>cccc<br>cccc | -<br>-<br>- | 9 Pixels to 24 Pixels |
| LONG | 0000<br>0000<br>0000 | 1101<br>1101<br>1101 | 0000<br>....<br>1111 | 0000<br>....<br>1111 | cccc<br>cccc<br>cccc | 25 Pixels to 280 Pixels |
| END OF BLOCK | 0000 | 0000 | - | - | - | - | cccc = 0001 to 1111

FIG. 7

VIDEO IMAGE COLOR ENCODING

BACKGROUND OF THE INVENTION

1. Field of the Invention

The present invention relates to the encoding and decoding of digital video image frames, and particularly to the coding of pixel color values.

2. Description of the Related Art

A well known technique is run length coding, used for example as one of the coding modes in the Compact Disc interactive (CD-i) standard. The technique allows sets of adjacent pixel values to be coded more compactly by specifying the color once and then the count of the number (n) of identical pixels instead of repeating the color code (n) times. Further information about run length coding may be found in, for example, "Principles of Interactive Computer Graphics" by W M Newman and R F Sproul, International Student Edition, 1979, pp 287–289, pub McGraw-Hill, ISBN 0-07-066455-2, and a brief summary of the relevant points will be given below with reference to prior art FIGS. 1 to 3 of the accompanying drawings.

SUMMARY OF THE INVENTION

Whilst run length coding is very efficient in terms of data compression for long runs, this efficiency is reduced for shorter runs and frames with a large number of short runs can be computationally expensive to encode. Accordingly, it is an object of the present invention to provide a coding scheme which achieves at least a reasonable degree of compression without incurring large overheads due to complexity.

In accordance with the present invention there is provided a method of encoding pixel color values for a digital video image frame in which each different color within the image is assigned a color value, where a predominant color is identified for the image frame, and runs of at least two successive pixels of the predominant color are encoded as a first code word indicating a run and a second code word indicating the run length, and wherein pixels having colors other than the predominant color are encoded as codes containing at least the respective color values.

Also in accordance with the present invention there is provided video image encoding apparatus arranged to encode pixel color values for a digital video image frame by assigning to each different color within the image a respective color value, wherein a predominant color is identified for the image frame, the apparatus including means operable to identify runs of at least two successive pixels of the predominant color and encode each such run as a first code word indicating a run and a second code word indicating the run length, and means operable to determine pixels having colors other than the predominant color and encode these as codes containing at least the respective color values.

Still further in accordance with the present invention there is provided a video image signal comprising encoded frames of pixel color values, wherein runs of two or more successive pixels of a predetermined predominant color for the frame are encoded in the form of a first code word indicating a run and a second code word indicating the run length, and pixels of colors other than the predetermined color are encoded in the form of a code containing at least the respective color value. A storage medium (such as a compact or floppy disc) carrying such a video image signal is also provided, together with initialisation data including specification of the said predetermined predominant color.

The invention additionally provides a video image display apparatus arranged to receive and decode signals such as described above, the said apparatus including at least one look-up table of pixel colors, including the predominant color, for the digital video image frames addressed by the encoded pixel color values, and means operable to generate for display runs of at least two successive pixels of the predominant color as well as individually generated pixels having colors other than the predominant color.

In a first embodiment of the invention, only the predominant color of the frame is run length coded. Thus, for the predominant color it is not necessary to specify the color code each time a run is specified. Also, as the predominant color, the efficiency is improved as the likelihood of runs is generally highest. A particularly common situation will be that there will be many runs of short to medium length in the predominant color with fewer such runs in other colors. To achieve higher efficiency for this situation, all runs of, for example, two or more pixels of the same color might be run-length encoded to achieve high data compression but still without the requirement for at least the short to medium length runs (e.g., 3 to 9 pixels) to contain a color code where the run is of the predominant color.

The first code word may suitably include a sub-code indicating one of a number of ranges of run lengths, with the second code word indicating a run length from within the range indicated. In this way, the length of the second code word can be kept shorter than would be the case if the absolute length were required to be specified.

In order to allow for situations where the predominant color changes within the frame (for example a "split-screen" with a different color background in each part), a further code may be provided including specification of a color value, wherein subsequent to the placing of the further code in a stream of pixel color codes, the predominant color specified for encoded runs is changed to the color specified in the further code. This further code is referred to as a CHANGE BACKGROUND code in the following description, and may comprise a first code word indicating a run and a sub-code indicating a change of predominant color, and a second code word comprising the color value for the new predominant color. By having the same sub-code in the first code word to indicate both a run and a change of predominant color, with the difference being indicated by a specific sub-code of the first code word, the number of "control" codes is kept to a minimum, thus allowing a greater number of "free" codes to be assigned to colors.

To avoid the inefficiency associated with run-length coding of short runs, runs of one or two pixels of the predominant color may be respectively coded as one or two successive iterations of the color value for the predominant color, or unique short codes may be respectively assigned.

To allow for the situation where the predominant color changes between successive frames, the code sequence for a frame may suitably commence with the further code specifying the initial predominant color, that is to say instructing a change to the specified predominant color to be used for all subsequent runs, even if unchanged from the previous frame.

If it is the case that the predominant color may change a number of times during the course of a frame, the change command may prove inefficient. Accordingly, in a still further embodiment of the present invention a subset of the colors within the image may be identified as predominant colors, with colors (other than predominant) being assigned respective color codes of a first length, predominant colors being assigned respective color codes of a second length shorter than the first, and runs of one of the predominant colors being encoded as a first code word indicating a predominant color run and a second code word indicating in separate subcodes the run length and (shorter) color code respectively.

BRIEF DESCRIPTION OF THE DRAWINGS

Preferred embodiments of the present invention will now be described, by way of example only, and with reference to the accompanying drawings in which:

FIG. 4 is a table of code values according to a first embodiment of the invention;

FIG. 5 is an alternative version of the table of FIG. 4, representing a first alternative embodiment of the invention;

FIGS. 6 and 7 are tables of code values for background and non-background pixels respectively, representing a further alternative embodiment of the invention;

DETAIL DESCRIPTION OF THE PREFERRED EMBODIMENTS

Figure 1:
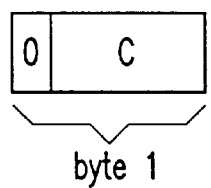
FIG. 1 represents a known color code for a single pixel.
Figure 2:
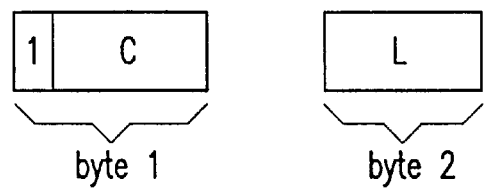
FIG. 2 represents a known color code for a pixel run of length L.
Figure 3:
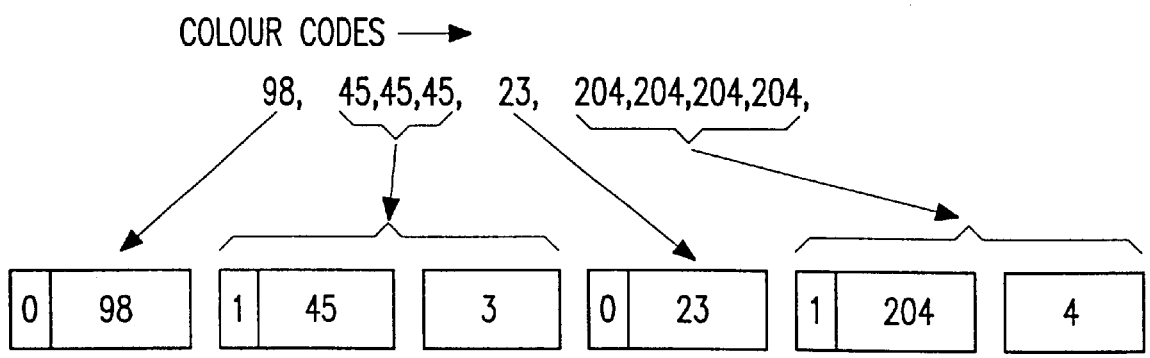
FIG. 3 represents a sequence of pixel color values converted to color codes as in FIGS. 1 and 2.

By way of illustration, it will initially be useful to consider a conventional scheme for encoding pixel color values, with reference to FIGS. 1 to 3. In the case where each pixel color value occupies seven bits (FIG. 1), as in the run length coding used for CD-i, the run specification (FIG. 2) occupies two bytes. One byte contains the color value C in seven of its bits and the other contains a count value L. For a run of more than two pixels length, the run length coded form will be more compact than separately coding each pixel of the run.

However, in this case coding a single pixel as a run of length one would be inefficient since this would occupy two bytes whereas the single color pixel could be contained in one byte. The run length coding scheme used for CD-i therefore allows two adjacent pixels to be defined in both a repeated one byte code and a two byte run length sequence. The spare bit in the color byte (the most significant bit) is used to indicate this difference. If a color byte has its most significant bit set to zero then it is a single color value as in FIG. 1 while if the most significant bit is set to one then this byte is the start of a run specification and will be followed by a length byte as in FIG. 2. These one and two byte codes are combined as required to produce a coded sequence, a selection of which is shown in FIG. 3.

The first embodiment of the invention provides coding for the particular case where an image principally consists of one background color with few instances of significant runs of any other color value. In such circumstances it is preferred to run length code runs of pixels of the background color but to individually color code the pixels of other runs. This eliminates the need to indicate in the coded data stream which color values in the coded stream represent run length coded material and which do not: in this way the initial bit setting of 0 or 1 (as with FIGS. 2 and 3) is not required. The technique also ensures that the run length coded data need only contain a count value; since one color is specified as background, it is not necessary to specify a color value for the run.

As will be described below, the method uses variable length code, which may comprise variable length code words, to further optimise performance. In the particular implementation to be described, all the variable length codes are set to be an integer number of four-bit words (nibbles) long.

Each pixel color value is defined in four bits. Conventionally, this would allow sixteen possible colors to be specified by the use of a color look up table, although in this embodiment the number of different colors is limited to fifteen, for reasons explained below, in order to improve the operation of the coding scheme.

Color codes 1 to 15 (expressed as nibble values 0001 to 1111) are not compressed, but are simply added to the coded data stream without further compression. The coding used to indicate background color run lengths is shown in the table of FIG. 4: the names given to the different codes (SHORT, MEDIUM etc) are merely illustrative and have no effect on the codes themselves. The benefits of run length coding can clearly be seen from the longest code shown in FIG. 4, that for a run of 303 background color pixels which, rather than requiring a color code nibble for each pixel, requires only 4 nibbles to define the run.

For background runs of 3 or more pixels, color code 0 (binary 0000) is placed in the coded stream to indicate the start of a run coded sequence of color 0, which is assumed to be the background color. If the following four bit code is in the range 0011 to 1111 then the run (SHORT) is of a length between 3 and 15 pixels, with the binary coded number of the second nibble directly representing the length of the run. Where the second nibble is also code 0 (0000), the run (MEDIUM) is of a length between 17 and 31 pixels, with a third nibble specifying a value from 1 to 15 (binary 0001 to 1111) to be added to 16 to give the run length.

If, on the other hand, the second nibble of the sequence is 0001, then the third nibble in the data stream has values between 0000 and 1111 representing run lengths (LONG) between 32 and 47 pixels.

The final case (LONGER) is that the second nibble has value 0010, and the two following four bit nibbles are taken together as an eight bit value representing run lengths between 48 and 303.

In order to allow a single pixel of background color to be represented in a single four-bit nibble, without the following code being misconstrued as a run length, color code 0001 is also taken to represent the background color: this is the reason why only 15 colors can be represented in this scheme. Additionally, unless it directly follows color code 0000 (as in the codes for 17, 32 or 49 pixel run lengths), code 0001 represents a single pixel of the background color. As will be noted from FIG. 4, there will never be more than two color 0 codes (0000) in sequence: this enables the scheme to satisfy MPEG constraints, where a series of such codes is used to indicate a re-synchronisation.

Since the coding arrangement described above only allows background color runs of 3 or more pixels, a background color run of length 2 (SINGLE+) is represented by two consecutive color values of 0001. Also, a background color run of a length 16 (SHORT+) is provided as a coded run of length 15 followed by a single pixel coded 0001. By the use of this second color code for the predominant or background color, expansion is avoided—that is to say a screen of N pixels will be coded in a maximum of N codes, and generally much fewer.

In an environment where code lengths are not constrained to be a multiple of four bits, Huffman coding (assigning the shortest codes to the most commonly specified run lengths) could give even more efficient compression. Codes of 8-bits or more may be used where it is necessary to have a large range of available colors, and 2-bit codes may be used where very few colors are required.

In an alternative embodiment, the above-recited method may be modified as described below with reference to the table of FIG. 5 to allow the background color represented by the color code 0000 to be changed dynamically. This would be useful where the background color changed part way down an image or where there is a large area of some other color where the advantage of run coding outweighed the overhead of changing the run coded color.

Comparison of FIGS. 4 and 5 will show that the two schemes are virtually identical save in that the codes for runs of 4 pixels upwards of the original embodiment now respectively represent run lengths one pixel shorter. the original embodiment code for a 3 pixel run (0000 0011) is now used as a CHANGE BACKGROUND code which indicates that the binary value (cccc) from 1 to 15 of the following nibble (0 is reserved to the general designation of the background) is the color code for the new background color. The new background will be used until the code 0000 0011 0001 (change code+ original background color code) is received or a change to a third background color is specified. Note that with a changed background, the code for a run of 15 pixels length will have the color code for that new background as the third nibble.

This alternative embodiment allows a change in the general background color of the image to be specified at a cost of 12 bits of data. A temporary change to allow a long run of some non-background color to be coded will cost 24 bits (12 to change to the non-background color and 12 to switch back to the background color again), which gives savings for runs of 9 or more pixels.

In a further alternative embodiment, all runs of color values (predominant/background or otherwise) may be run-length encoded, whilst still using the identification of a predominant color to produce savings for the most common occurrence, that is to say relatively short runs of background color pixels. The coding schemes for background and non-background runs are shown in FIGS. 6 and 7 respectively. In this scheme, color codes 0 to 15 are available (indicated in FIG. 7 as four-bit code cccc) with only code 0 reserved to the predominant color. Since code 0 is also used to indicate the start of a run (of any color) the code for a single background pixel (0000 1111) is wasteful but necessary to avoid anomalies. If a second color code (e.g., 1) were assigned to the background color, the single background pixel could be coded in a single nibble, as with the schemes of FIGS. 4 and 5, albeit at the expense of a reduction in available color codes. As shown by FIG. 6, the particular saving for this scheme occurs with background runs of from three to nine pixels, each of which is encoded in a two nibble code. For background runs of 10 pixels or more, the same run-length coding scheme is used as for non-background colors (shown in FIG. 7), that is to say comprising the run code (code 0), a range code (1100 or 1101 for MEDIUM or LONG runs respectively) the run length (4-bits for MEDIUM, 8-bits for LONG) and the color code.

As shown in FIG. 7, runs of 1 to 3 pixels of non-background color are simply coded as separate instances of the color code. Runs of from 4 to 7 pixels are coded as the run code (code 0) a run length code (4 to 7 indicated by respective binary values 1000 to 1011) and the color code (cccc). In similar manner to the SHORT+ codes of the FIGS. 4 and 5 schemes, a run of eight non-background pixels is coded as a seven pixel run followed by a repetition of the color code (i.e the code for a single pixel).

As the coded pixel values will generally be sent or stored as blocks of values, a further code is provided (0000 0000) to indicate the end of a block. Determination as to the start of a code will be handled at system level, such that the appearance of two consecutive nibbles of 0000 after the start of a code (as in the code for a run of 25 background pixels) will not be taken as indicating the end of a block.

In a still further alternative embodiment, the benefits arising from selection of a predominant or background color may be extended to allow for a subset of predominant colors to be specified: in this way the repeated use of the CHANGE BACKGROUND code of the scheme of FIG. 5 may be avoided. The specification of a subset has particular benefit where longer codes are used, for example an 8-bit scheme where 256 color codes are available. With such a scheme, the 16 most commonly used colors are coded as 4-bit (rather than 8-bit) values. In this way runs of between 3 and 9 pixels may be coded in two 8-bit words as 0000 0000 0LLL cccc where the first word indicates a run of one of the predominant colors, the first half of the second word specifies the run length (0001 to 0111) and the second half of the second word comprises the 4-bit color code. It will be noted that the first bit of the second word is 0 in this arrangement: this allows other coding possibilities including a full range of colors (indicated by using 1 at the start of this word).

As will be appreciated, whilst the benefits are greater for higher number bit schemes, the above technique of subsets could be applied to a 4-bit scheme, although the range of available run lengths or color codes would be greatly restricted.

Turning now to apparatus for applying the above described schemes, encoding will generally be carried out by a suitably programmed microprocessor performing the functions of identification of the predominant color, assignment of color codes to pixels, and detecting single instances and runs of the predominant color. Dedicated hardware may instead be provided but the flexibility of a reprogrammable system is preferred.

Figure 8:
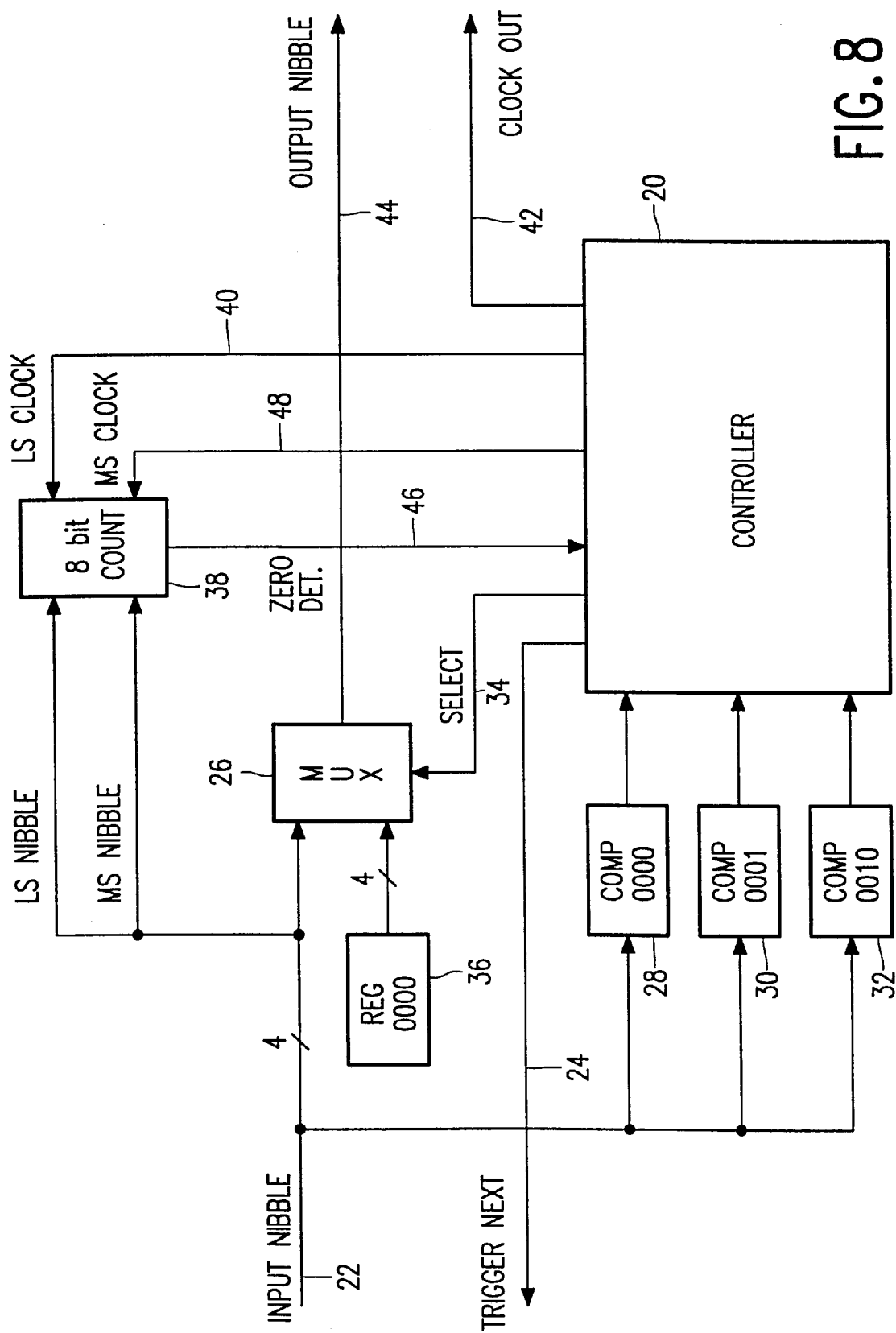
FIG. 8 is a block schematic diagram of a pixel code detector stage for a decoder apparatus.
Figure 9:
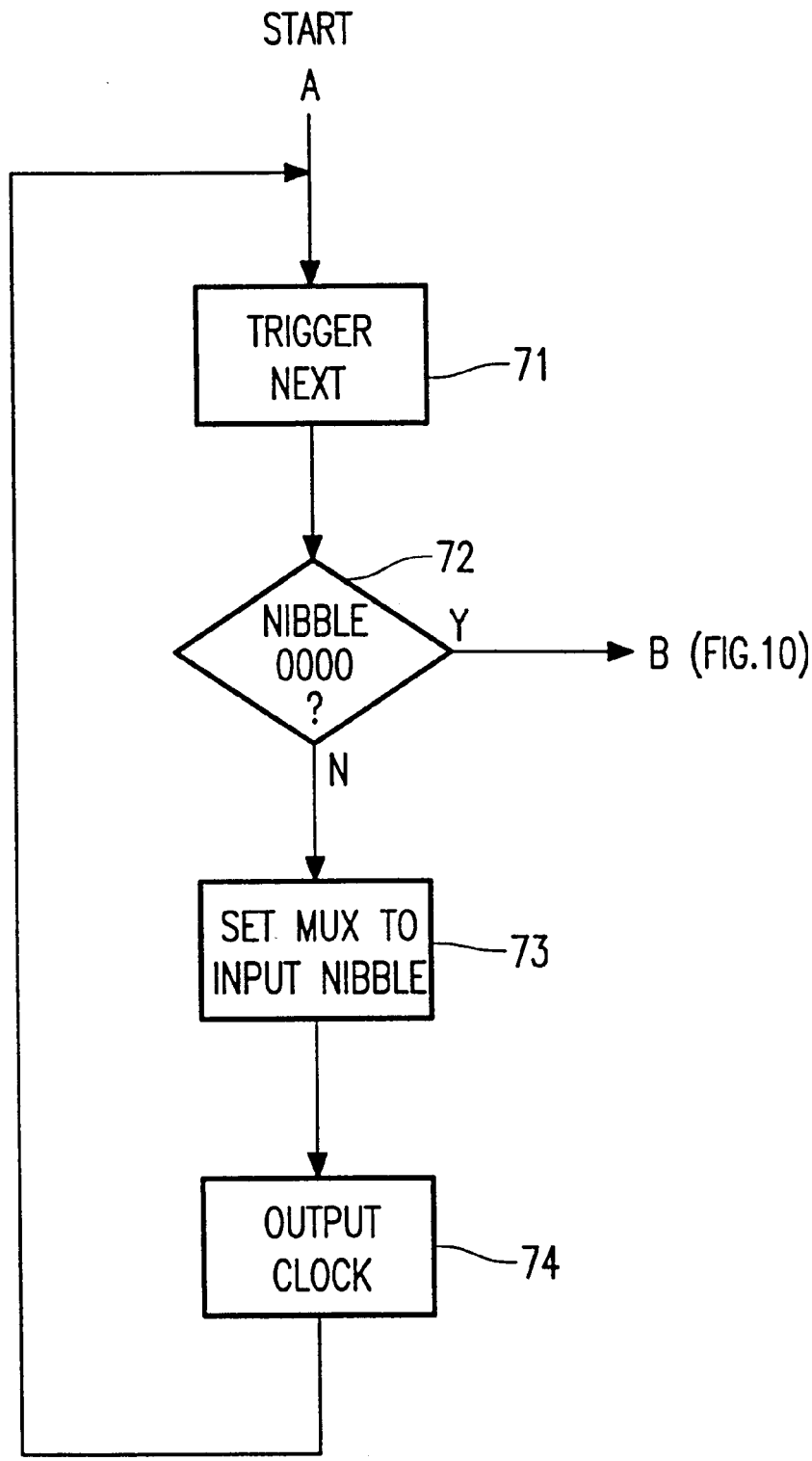
FIGS. 9 to 13 are flow charts illustrating operation of the controller of FIG. 8.

Considering in detail the implementation of the scheme of FIG. 4, the code detector, for use in a decoder apparatus, may suitably be formed in hardware and have an arrangement as shown in FIG. 8, where controller 20 controls the output nibble value (the color code for each particular pixel) as well as an output clock signal, which clocks those nibble values. The controller requests input of a nibble on line 22 by sending a trigger signal on line 24. This input nibble is supplied to the first input of a multiplexer 26 as well as to each of three comparator stages 28,30 and 32, the outputs of which are supplied to the controller 20. The three comparators 28,30,32 respectively compare the input nibble with codes 0000, 0001 and 0010: if the output from comparator 28 is positive, that is to say the input nibble is code 0000, then the start of a run is indicated, in which case the controller sends a signal on select line 34 to the multiplexer 26 causing it to select, rather than the input nibble value, the color code for the predominant (background) color stored in register 36.

Having determined that a run is commencing, the next nibble will be called for (via line 24) and, if the outputs of any of comparators 28,30 or 32 are positive, this will indicate the run is within the ranges identified as MEDIUM, LONG, or LONGER respectively as identified in FIG. 4. If the output of none of the comparators is positive, then the run is in the SHORT range, that is to say between three and fifteen pixels and the input nibble value is actually the duration of the run. This nibble value is clocked into an 8-bit counter 38 as the least significant nibble under control of a clock signal on line 40 from the controller 20. As the counter 38 counts down the value represented by the nibble, the output clock signal on line 32 clocks the background color value from register 36 on the output line 44 until such time as the nibble value has been counted out, when a zero detect signal from the counter is passed to the controller via line 46.

In the case where a run has been detected and the second nibble produces a positive output from one of comparators 28, 30 or 32, the following nibble (once called for) will be clocked into the counter 38 as the least significant nibble (in the case of positive output from comparators 28 or 30) and the following two nibbles will be read into the counter as respectively the most and least significant nibbles in the case of a positive output from comparator 32. Where two nibbles are clocked into the 8-bit counter 38, that is to say in the case of a LONGER run the most significant nibble is clocked into the counter under control of a further clock line 48 from the controller.

The operations of the controller 20 of FIG. 8 in determining whether the input code describes a run, and if so, how long it is, will now be described with reference to the flow charts of FIGS. 9 to 13. From a start point A (FIG. 9) a new input nibble is triggered at 71 following which the output of the comparators is checked, at step 72, to see whether the nibble is code 0000. If not, the code accordingly represents the color code (color other than background) for a pixel and, at step 73, the multiplexer 26 (FIG. 8) is set to output the input nibble value. At step 74, one clock signal for this nibble value is also output following which the procedure returns to start point A for the next input nibble.

Figure 10:
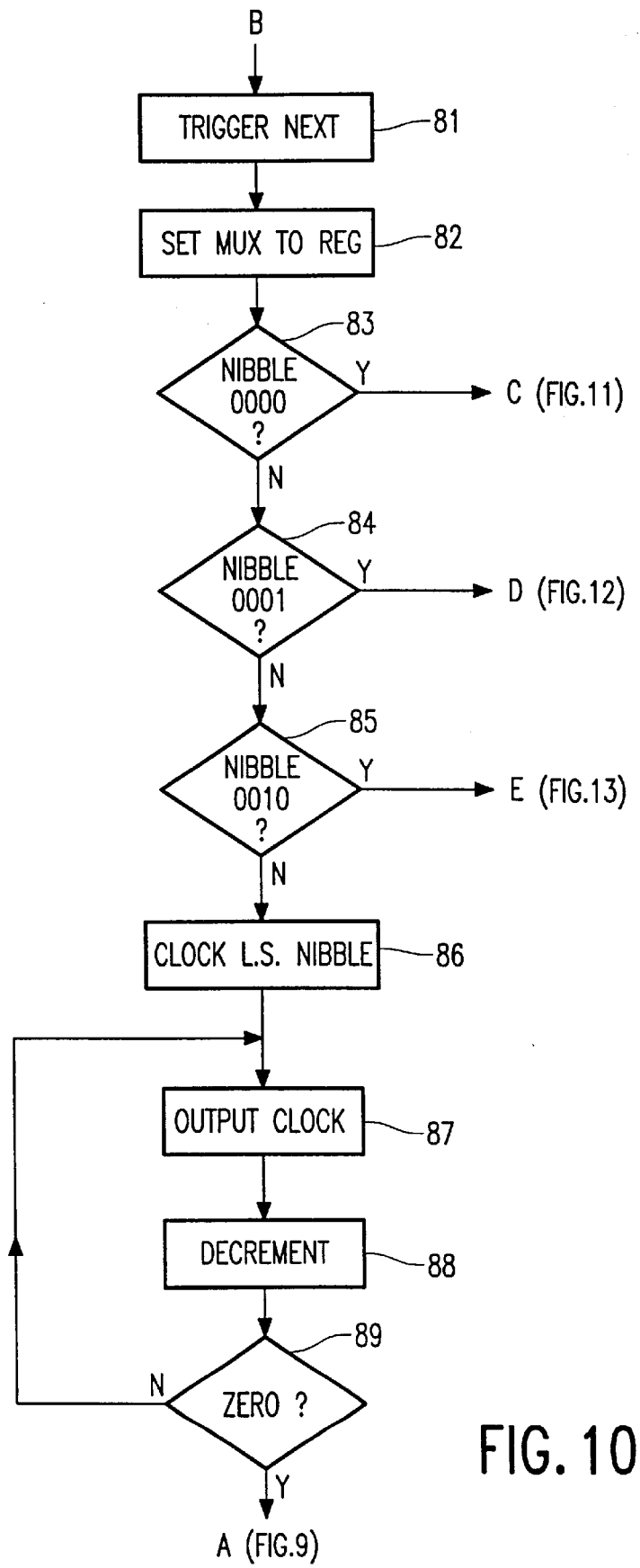
Figure 11:
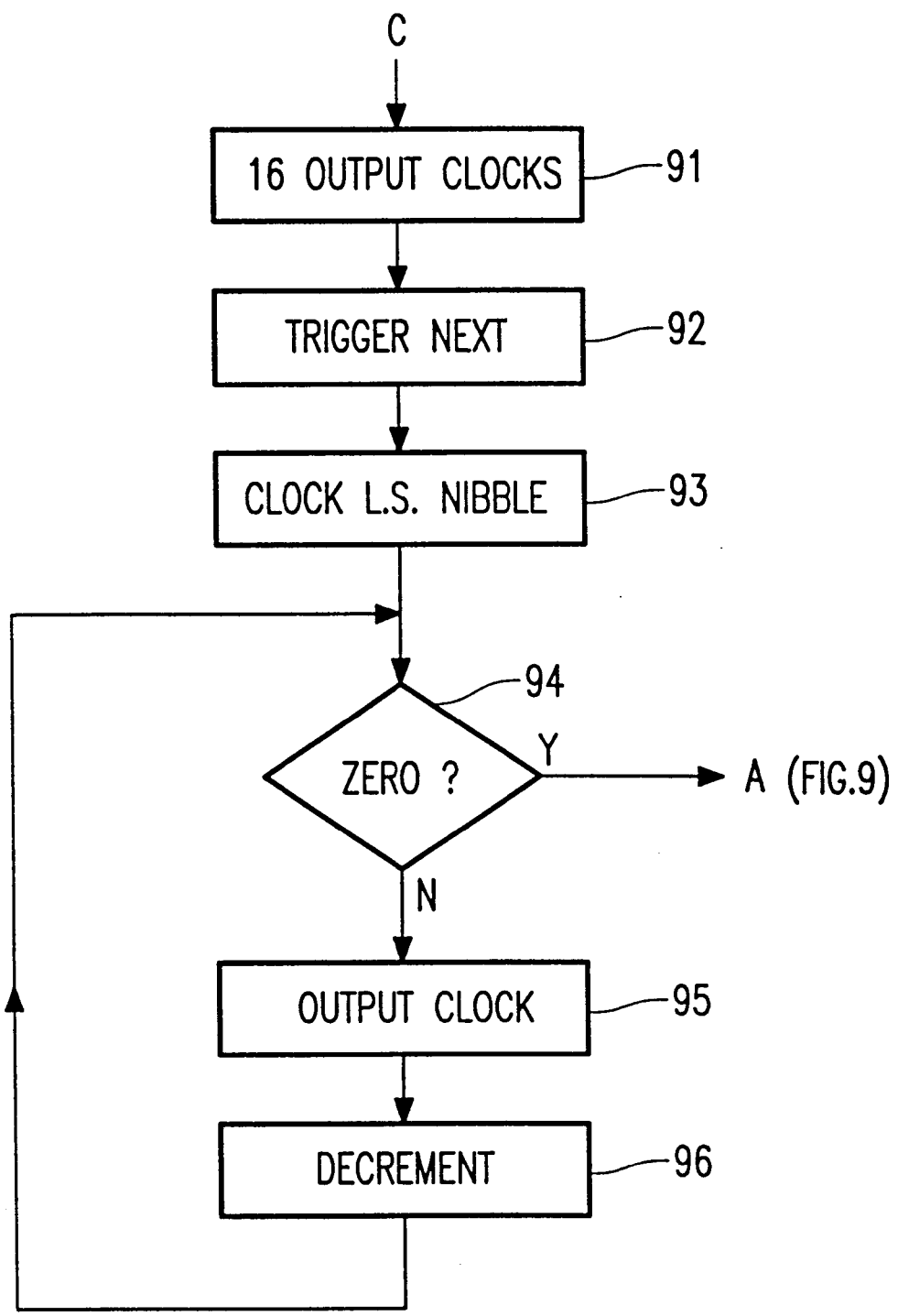
Figure 12:
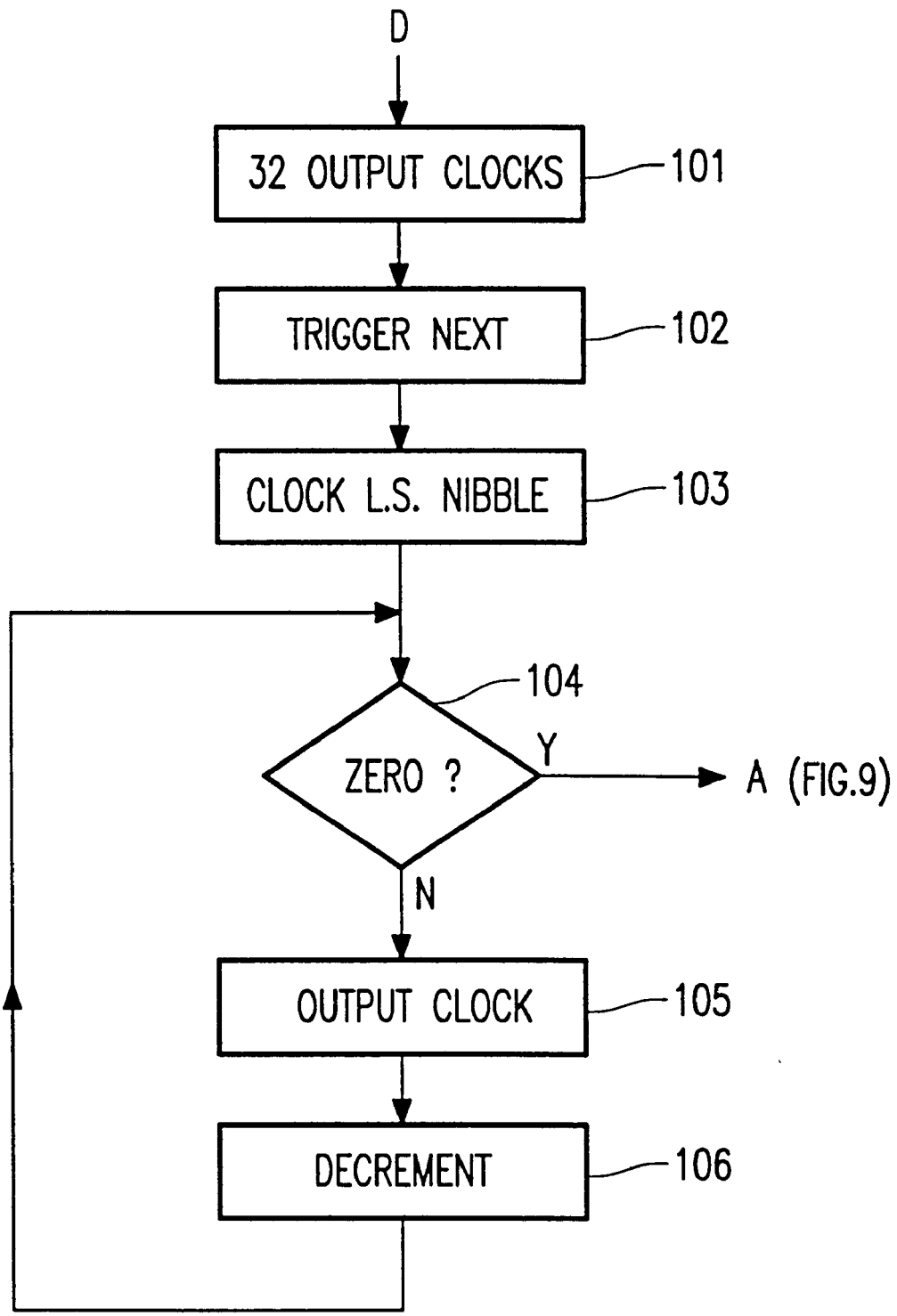
Figure 13:
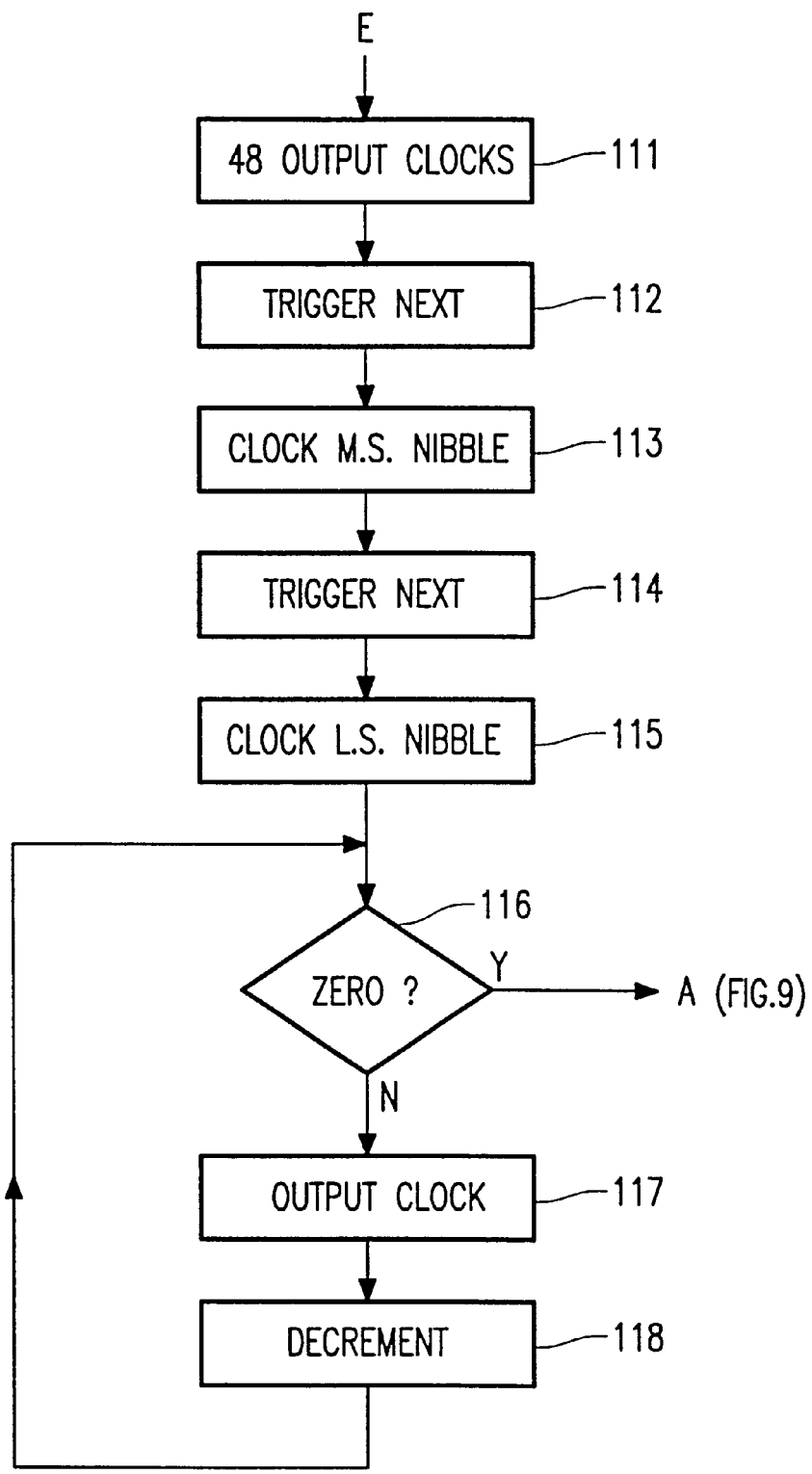

Where, at step 72, the nibble value is 0000 a run is indicated which is processed generally as shown in FIG. 10. The processing of a run starts at step 81, with the triggering of the next input nibble and, at step 82, by setting the multiplexer 26 (FIG. 8) to output color code 0000 from register 36. Following this, the new input nibble is checked at steps 83, 84 and 85 to see whether it corresponds to one of the nibble 2 codes from FIG. 4 representing a MEDIUM, LONG, or LONGER run as identified in that Figure. If the answer is "No" to all of these checks, then the run is in the range of three to fifteen pixels and the nibble value, loaded into the 8-bit counter, sets the value to be clocked. The repeated outputting of clock signals for the color code 0000 is handled by loop stages 87, 88 and 89 which repeatedly decrement the clock value and check for zero whilst outputting the clock signal until such time as the counter reaches zero at which point the process returns to start A (FIG. 9) for the next input nibble value.

Where any of the stages 83, 84 or 85 of FIG. 10 answers "Yes", a run in the range of 17 to 303 pixels is specified. Where it is the output from stage 83 which is "Yes" (the second nibble value is 0000), the run is in the range of 17 to 31 pixels and is handled as shown in FIG. 11. Initially, at stage 91, the value 0000 from register 36 is clocked out 16 times, following which a new input nibble is triggered at step 92 which nibble is clocked into the 8-bit counter at step 93. This least significant nibble value in counter 38 is then clocked out by countdown/zero detect loop (steps 94, 95 and 96) until the counter reaches zero, at which point the process returns to start A (FIG. 9) for the next input nibble.

Where the nibble 2 value is detected as 0001, at step 84 of FIG. 10, the run is between 32 and 47 pixels which is handled as shown in FIG. 12. The handling of the LONG run in FIG. 12 is substantially identical to that for the MEDIUM run of FIG. 11, save in that the color code 0000 is clocked out 32 times at stage 101 prior to triggering and clocking into the counter of the next nibble value at steps 102 and 103. Again, the countdown loop of steps 104, 105 and 106 causes output of the additional clock values beyond 32 forming the total run length.

Where the output of step 85 of FIG. 10 is positive, that is to say the run is LONGER of length between 48 and 303 pixels, the run is handled as shown in FIG. 13. In this case, the process starts by clocking out the value 0000 48 times at step 111 following which the next input nibble is triggered at step 112. Since, for a LONGER run, the run length beyond 48 pixels is specified as an 8-bit code, the nibble triggered at step 112 represents the most significant half of the 8-bit code and is clocked into the 8-bit counter as such under control of a signal from the controller on line 48 (FIG. 8). Following this the next nibble is triggered at step 114 which nibble, comprising the least significant half of the 8-bit code is clocked in as the least significant nibble into 8-bit counter 38. Finally, the countdown loop formed by steps 116, 117 and 118 counts down the 8-bit value represented in the counter until this reaches zero at which point the process returns to start A of FIG. 9.

Whilst not shown in FIG. 8, it will be appreciated that, where a change of background is permitted (as with the table of FIG. 5) the contents of register 36 may be modified under control of the controller 20 to contain the newly selected background color value rather than 0000. In addition, the number of times this value is initially clocked out for a run, at steps 91, 101 and 111 of FIGS. 11, 12 and 13 respectively, will be 15, 31 and 47 rather than 16, 32 and 48 as previously described.

In order to effect the coding scheme of FIGS. 6 and 7, the modifications to the apparatus of FIG. 8 will be generally apparent to the skilled reader and will not be discussed in detail. It will be understood that the comparison stages 28,30,32 will need to be configured to check for the particular code words used, and that register 36 will have provision for receiving, storing and outputting (under control of controller 26) color values other than the background color value during runs of the non-background colors. Similar considerations apply to the embodiment supporting subsets of predominant colors.

From reading the present disclosure, other modifications will be apparent to persons skilled in the art. Such modifications may involve other features which are already known in the field of video signal encoding systems and devices and component parts thereof and which may be used instead of or in addition to features already described herein. Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

What is claimed is:

1. A method of encoding pixel color values for a digital video image frame having at least three pixel color values in which each different color within the image is assigned a color value, the method comprising the steps of:

identifying a predominant color in the image frame;

encoding runs of at least two successive pixels of the predominant color without a code for a color value of the predominant color, the encoding step encoding the at least two successive pixels as a first code word indicating a run and a second code word indicating the run length; and encoding pixels having colors other than the predominant color as codes containing at least the respective color values of the pixels.

2. A method as claimed in claim 1, wherein each pixel having a color other than the predominant color is separately coded as its respective color value only.

3. A method as claimed in claim 1, wherein runs of two or more successive pixels of a color other than the predominant color are encoded together as a first code word indicating a run, a second code word indicating the run length and a third code word indicating the color value.

4. A method as claimed in claim 1, wherein the first code word includes a sub-code indicating one of a number of ranges of run lengths and the second code word indicates a run length from within the range indicated.

5. A method as claimed in claim 1, in which a further code is provided including specification of a color value, wherein subsequent to the placing of the further code in a stream of pixel color codes, the predominant color specified for encoded runs is changed to the color specified in the further code.

6. A method as claimed in claim 5, wherein the further code comprises a first code word indicating a run and a sub-code indicating a change of predominant color, and a second code word comprising the color value for the new predominant color.

7. A method as claimed in claim 1, wherein runs of one or two pixels of the predominant color are respectively coded as one or two successive iterations of the color value for the predominant color.

8. A method as claimed in claim 5, wherein the code sequence for a frame commences with the further code specifying the initial predominant color.

9. A method as claimed in claim 1, in which a subset of the colors within the image are identified as predominant colors, colors other than predominant colors are assigned respective ones of a first range of color value codes of a first length, the predominant colors are assigned respective ones of a second range of color value codes of a second length shorter than the first length, and a run of at least two pixels of one of the predominant colors is encoded as a first code word indicating a predominant color run and a second code word indicating in separate sub-codes the run length and color value code respectively.

10. A method as claimed in claim 1, wherein the second code word precedes the first code word in the code for a run.

11. A video image encoding apparatus arranged to encode pixel color values for a digital video image frame having a predominant color and at least three pixel color values, the apparatus comprising:

means for identifying runs of at least two successive pixels of the predominant color, and for encoding each such run without a code for a color value of the predominant color, each run being encoded as a first code word indicating a run and a second code word indicating the run length; and means for determining pixels having colors other than the predominant color, and for encoding these pixels as codes containing at least the respective color values of the pixels.

12. A video image signal comprising encoded frames of at least three pixel color values, wherein runs of two or more successive pixels of a predetermined predominant color for the frame are encoded in the form of a first code word indicating a run and a second code word indicating the run length, and pixels of colors other than the predetermined color are encoded in the form of a code containing at least the respective color value.

13. A storage medium carrying a video image signal, the video image signal comprising:

an encoded frame having pixels with at least three color values; and initialization data which specifies a predetermined predominant color in the encoded frame;

wherein runs of two or more successive pixels having said predetermined predominant color are encoded without a code for a color value of the predominant color, the two or more consecutive pixels being encoded in the form of a first code word indicating a run and a second code word indicating a respective run length; and wherein pixels having colors other than said predetermined predominant color are encoded in the form of a code containing at least the respective color value of the pixels.

14. A video image display apparatus for receiving and decoding a video image signal having encoded frames comprised of pixels having at least three color values, wherein runs of two or more successive pixels having a predetermined predominant color are encoded in the form of a first code word indicating a run and a second code word indicating the run length, and pixels of colors other than the predetermined predominant color are encoded without a code for a color value of the predetermined predominant color and in the form of a code containing at least the respective color value, said apparatus comprising:

storing means which stores at least one look-up table of pixel colors, including the predetermined predominant color, for a digital video image frame addressed by the encoded pixel color values; and means for generating and displaying runs of at least two successive pixels of the predominant color, together with individual pixels having colors other than the predominant color.

15. The method as claimed in claim 1, wherein, in the identifying step, said image frame has up to fifteen different pixel color values.

16. The method as claimed in claim 15, wherein the respective color values of said pixels having colors other than the predominant color are encoded in 4-bit code.

17. The storage medium as claimed in claim 13, wherein said encoded frame has pixels with up to fifteen different color values.

18. The storage medium as claimed in claim 17, wherein the respective color values of said pixels having colors other than the predominant color are encoded in 4-bit code.

19. The video image display apparatus as claimed in claim 14, wherein said encoded frames each are comprised of pixels having up to fifteen different color values.

20. The video image display apparatus as claimed in claim 19, wherein the respective color values of said pixels having colors other than the predominant color are encoded in 4-bit code.

* * * * *